United States Patent
DiSabatino

(10) Patent No.: US 10,470,380 B2
(45) Date of Patent: Nov. 12, 2019

(54) LUBRICATION SYSTEM

(71) Applicant: Deere & Company, Moline, IL (US)

(72) Inventor: Benjamin DiSabatino, Brantford (CA)

(73) Assignee: DEERE & COMPANY, Moline, IL (US)

( * ) Notice: Subject to any disclaimer, the term of this patent is extended or adjusted under 35 U.S.C. 154(b) by 7 days.

(21) Appl. No.: 15/337,739

(22) Filed: Oct. 28, 2016

(65) Prior Publication Data

US 2018/0116133 A1    May 3, 2018

(51) Int. Cl.
*A01G 23/091*    (2006.01)
*B23D 59/02*    (2006.01)

(52) U.S. Cl.
CPC ......... *A01G 23/091* (2013.01); *B23D 59/02* (2013.01)

(58) Field of Classification Search
CPC .... A01G 23/08; A01G 23/081; A01G 23/085; A01G 23/091; A01G 23/095; F16C 43/04; A01D 69/005; A01D 69/03; A01D 69/12
USPC ............. 144/34; 184/6.18, 6; 60/455; 92/86
See application file for complete search history.

(56) References Cited

U.S. PATENT DOCUMENTS

| | | | | |
|---|---|---|---|---|
| 2,398,944 A | * | 4/1946 | Kopetz | F16N 7/40 184/6 |
| 2,665,122 A | * | 1/1954 | Rowland | F15B 21/00 184/6.18 |
| 3,877,546 A | | 4/1975 | Shrader | |
| 4,077,445 A | * | 3/1978 | Wirt | A01G 23/083 144/339 |
| 4,762,479 A | * | 8/1988 | Uppal | F04C 15/0088 418/102 |
| 4,939,900 A | | 7/1990 | Furumoto et al. | |
| 5,045,034 A | | 9/1991 | Almeda, Jr. | |
| 6,035,736 A | | 3/2000 | Gyllner et al. | |
| 6,324,952 B1 | * | 12/2001 | Daly | A01G 23/091 144/34.1 |
| 6,640,850 B1 | * | 11/2003 | Hicks | A01G 23/091 144/336 |
| 6,902,382 B2 | * | 6/2005 | Christensen | F04C 2/18 418/132 |
| 7,228,880 B2 | * | 6/2007 | Taillon | A01G 23/08 144/24.12 |
| 9,301,457 B2 | * | 4/2016 | DiSabatino | A01G 23/081 |
| 2012/0312421 A1 | * | 12/2012 | Trom | A01G 23/099 144/4.1 |
| 2015/0354609 A1 | | 12/2015 | Dauderman et al. | |

\* cited by examiner

*Primary Examiner* — Shelley M Self
*Assistant Examiner* — Smith Oberto Bapthelus

(57) ABSTRACT

In accordance with an example embodiment, an attachment for a work vehicle includes a hydraulic motor including a case cavity, a bearing, a mandrel received by the bearing, and a disc saw rotationally coupled to the hydraulic motor via the mandrel. A mandrel cavity surrounds the mandrel, and at least a portion of the bearing is disposed within the mandrel cavity. The mandrel cavity is hydraulically connected to the case cavity downstream of the case cavity.

20 Claims, 3 Drawing Sheets

LUBRICATION SYSTEM

TECHNICAL FIELD

The present disclosure generally relates to a machine. An embodiment of the present disclosure relates to a lubrication system for a mandrel and bearings rotating with a disc saw.

BACKGROUND

Work vehicles may be configured to utilize attachments or implements with rotating parts, such as a disc saw. The rotating parts may include splined shafts and receptacles, bearings, and mandrels, among other parts. Lubricating these components may improve the performance or increase the service life of the components and attachment.

SUMMARY

Various aspects of examples of the present disclosure are set out in the claims.

According to an aspect of the present disclosure, an attachment for a work vehicle may include a hydraulic motor including a case cavity, a bearing, a mandrel received by the bearing, a disc saw rotationally coupled to the hydraulic motor via the mandrel, and a mandrel cavity surrounding the mandrel. At least a portion of the bearing may be disposed within the mandrel cavity. The mandrel cavity may be hydraulically connected to the case cavity downstream of the case cavity.

According to another aspect of the present disclosure, the attachment may include a mounting flange on which the hydraulic motor is mounted and a case drain port, where the case drain port hydraulically connects the case cavity and the mandrel cavity and is located within a perimeter of the mounting flange.

According to another aspect of the present disclosure, a hydraulic line may hydraulically connect the case cavity and the mandrel cavity.

According to another aspect of the present disclosure, the mandrel cavity may be hydraulically connected to a hydraulic return line and the hydraulic return line may return hydraulic fluid from the case cavity to a hydraulic reservoir via the mandrel cavity.

According to another aspect of the present disclosure, a mandrel drain port may hydraulically connect the mandrel cavity to the hydraulic return line and at least a portion of the mandrel drain port may be located above at least a portion of the bearing when the attachment is upright.

According to another aspect of the present disclosure, there may be an axis about which the mandrel rotates and a mandrel drain port may hydraulically connect the mandrel cavity to the hydraulic return line with the bearing located above the disc saw along the axis and at least a portion of the mandrel drain port located above at least a portion of the bearing along the axis.

According to another aspect of the present disclosure, a mandrel inlet port may hydraulically connect the case cavity and the mandrel cavity, a mandrel drain port may hydraulically connect the mandrel cavity and the hydraulic return line, and there may be an axis about which the mandrel rotates. The bearing may be located above the disc saw along the axis with at least a portion of the mandrel inlet port located above at least a portion of the bearing along the axis and at least a portion of the mandrel drain port located below at least a portion of the bearing along the axis.

According to another aspect of the present disclosure, a case drain port may be included in the hydraulic motor and a mandrel inlet port may cooperate to hydraulically connect the case cavity and the mandrel cavity. The mandrel drain port may hydraulically connect the mandrel cavity and the hydraulic return line. The case drain port, mandrel inlet port, mandrel drain port, and hydraulic return line may be configured to cause hydraulic fluid to flow from the case cavity to the hydraulic reservoir via the mandrel cavity.

According to another aspect of the present disclosure, the case drain port may be included in the hydraulic motor and hydraulically connected to the case cavity. The hydraulic line may hydraulically connect the case drain port and a mandrel inlet port. The mandrel inlet port may hydraulically connect the hydraulic line and the mandrel cavity. The mandrel drain port may hydraulically connect the mandrel cavity to a hydraulic return line. The hydraulic return line may hydraulically connect the mandrel drain port to a hydraulic reservoir.

According to another aspect of the present disclosure, there may be an axis about which the mandrel rotates. The bearing may be located above the disc saw along the axis, at least a portion of the mandrel inlet port may be located below at least a portion of the bearing along the axis, and at least a portion of the mandrel drain port may be located above at least a portion of the bearing along the axis.

According to another aspect of the present disclosure, the lowest portion of the mandrel drain port may be located above the highest portion of the bearing along the axis.

According to another aspect of the present disclosure, the bearing may be a lower bearing, and there may be an axis about which the mandrel rotates, the lower bearing located above the disc saw along the axis and an upper bearing (the mandrel received by the upper bearing) located a distance above the lower bearing along the axis.

According to another aspect of the present disclosure, the attachment is configured so hydraulic fluid flows from the case cavity to the mandrel cavity to a hydraulic reservoir.

According to another aspect of the present disclosure, the attachment is configured so hydraulic fluid enters the mandrel cavity below at least a portion of the lower bearing along the axis and exits the mandrel cavity above at least a portion of the upper bearing along the axis.

According to another aspect of the present disclosure, the attachment is configured so hydraulic fluid enters the mandrel cavity above at least a portion of the upper bearing along the axis and exits the mandrel cavity below at least a portion of the lower bearing along the axis.

According to another aspect of the present disclosure, a case drain port is included in the hydraulic motor and hydraulically connects to the case cavity, a hydraulic line hydraulically connects the case drain port and a mandrel inlet port, the mandrel inlet port hydraulically connects the hydraulic line and the mandrel cavity, a mandrel drain port hydraulically connects the mandrel cavity to a hydraulic return line, and the hydraulic return line hydraulically connects the mandrel drain port to a hydraulic reservoir.

According to another aspect of the present disclosure, the mandrel cavity is fluid-tight except for the mandrel inlet port and the mandrel drain port.

According to another aspect of the present disclosure, a disc saw felling head may include a hydraulic motor, a mandrel, an axis, an upper bearing, a lower bearing, a disc saw, and a hydraulic return line. The hydraulic motor includes a high pressure port, a low pressure port, a case cavity, a case drain port, and an output shaft. The hydraulic motor is powered by the flow of hydraulic fluid into the high pressure port and out of the low pressure port. The case drain port drains hydraulic fluid from the case cavity to outside the hydraulic motor. The mandrel is rotationally coupled to the output shaft. The mandrel rotates about the axis. The mandrel cavity includes a mandrel inlet port and a mandrel drain port and surrounds the mandrel. The upper bearing is at least partially disposed within the mandrel cavity and receives the mandrel. The lower bearing is at least partially disposed within the mandrel cavity and receives the mandrel. The disc saw is rotationally coupled to the hydraulic motor via the mandrel and powered by the hydraulic motor. The lower bearing is positioned between the upper bearing and the disc saw along the axis and the disc saw felling head is configured so hydraulic fluid from the case cavity flows through the case drain port, through the mandrel inlet port, through the mandrel cavity, through the mandrel drain port, to the hydraulic return line.

According to another aspect of the present disclosure, the disc saw felling head is configured so hydraulic fluid from the case cavity flows through the case drain port, through the hydraulic line, through the mandrel inlet port, through the mandrel cavity, through the mandrel drain port, through the hydraulic return line, to a hydraulic reservoir. At least a portion of the mandrel inlet port is positioned between at least a portion of the lower bearing and the disc saw along the axis and at least a portion of the mandrel drain port is positioned between at least a portion of the upper bearing and the output shaft along the axis.

According to another aspect of the present disclosure, at least a portion of the mandrel inlet port is positioned between at least a portion of the upper bearing and the output shaft along the axis and at least a portion of the mandrel drain port is positioned between at least a portion of the lower bearing and the disc saw along the axis.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
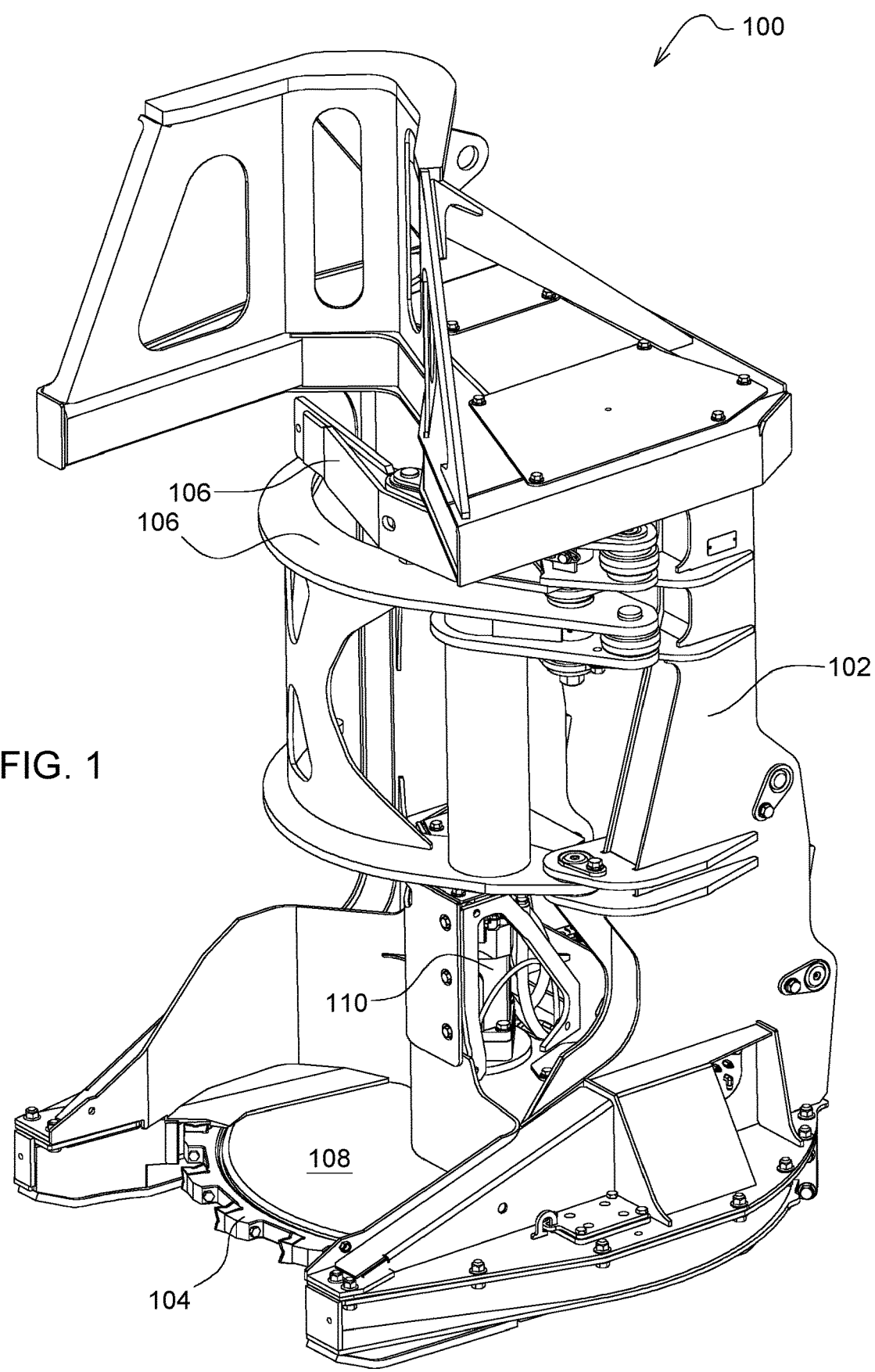
FIG. 1 is a perspective view of a an attachment for a work vehicle, specifically a disc saw felling head.
Figure 2:
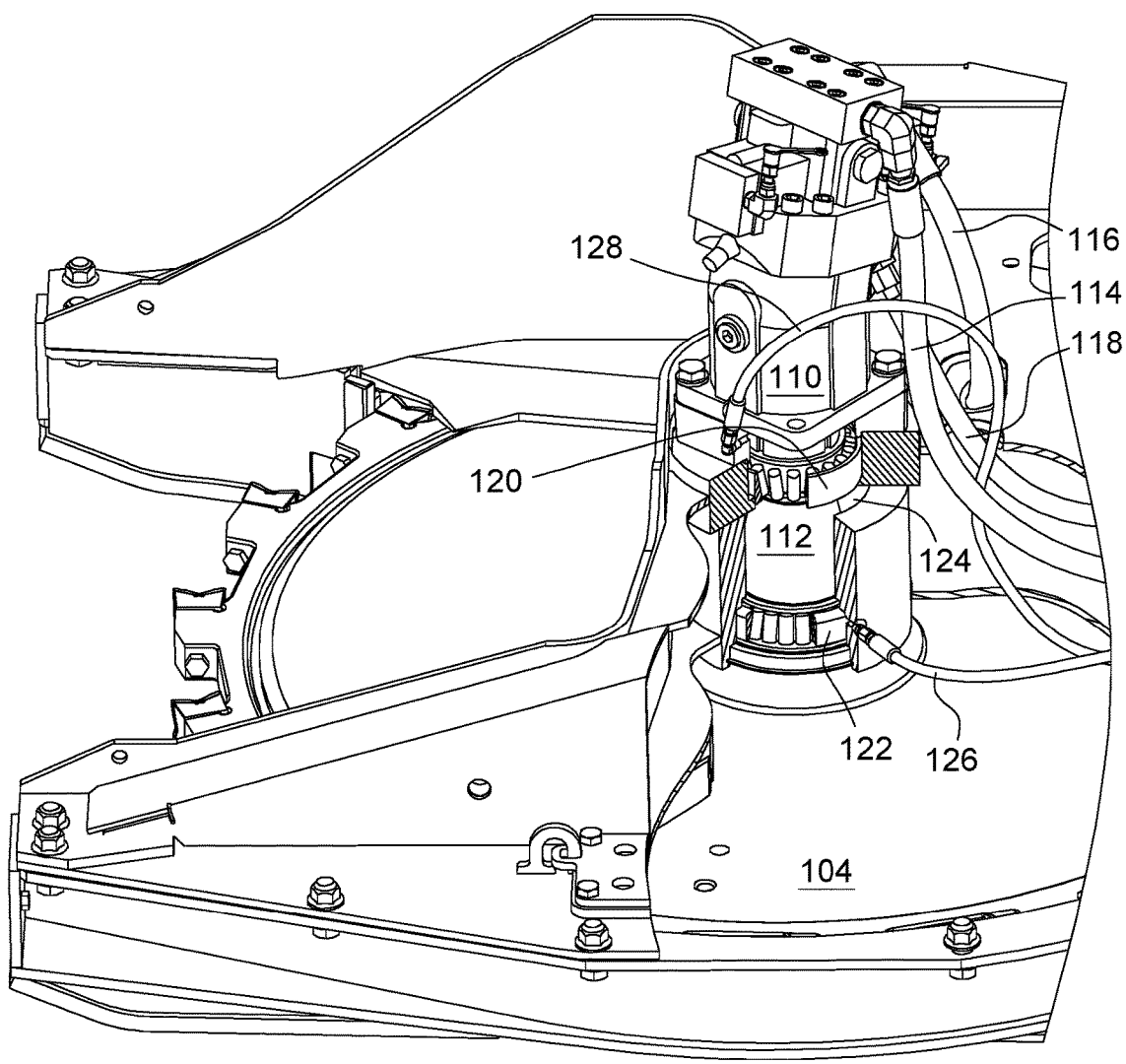
FIG. 2 is a partial cutaway view of the disc saw felling head, showing a hydraulic motor, mandrel, top bearing, and bottom bearing.
Figure 3:
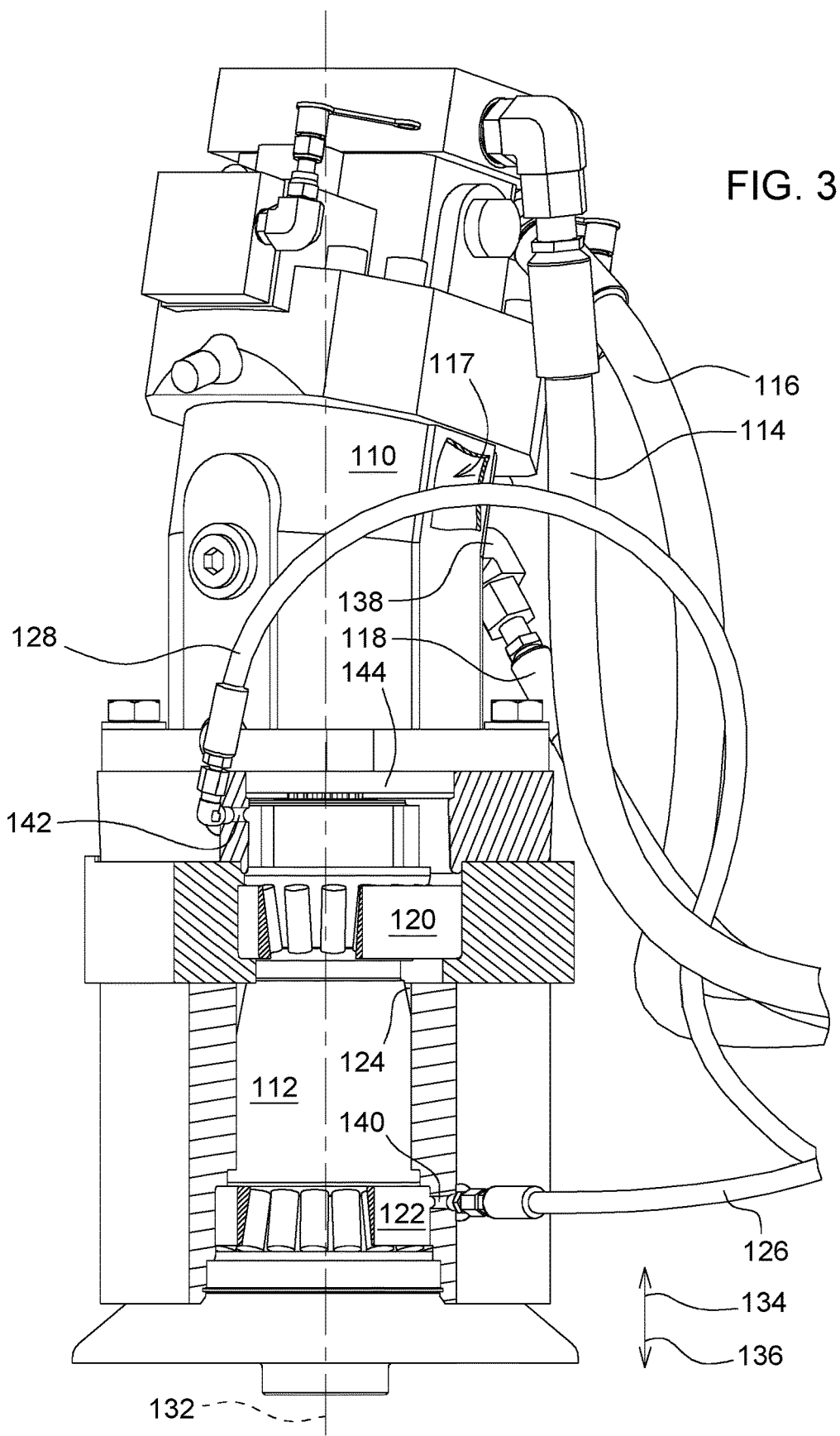
FIG. 3 is a partial cutaway view of the hydraulic motor, mandrel, top bearing, and bottom bearing.

At least one example embodiment of the subject matter of this disclosure is understood by referring to FIGS. 1 through 3 of the drawings.

FIG. 1 illustrates an attachment for a work vehicle, in this embodiment a disc saw felling head 100 which can be attached to a forestry vehicle, such as a feller buncher or harvester. Disc saw felling head 100 is comprised of a rigid frame 102 which provides strength and structure for the attachment, and allows for it to be mounted to the forestry vehicle through multiple pins and linkage members. Actuators connected to the linkage members through which the disc saw felling head 100 is mounted to the forestry vehicle, such as hydraulic cylinders, may be utilized to raise, lower, or tilt the disc saw felling head 100 relative to the forestry vehicle. The disc saw felling head 100 is electrically and hydraulically connected to the forestry vehicle through a wiring harness and hydraulic hoses or tubes. These connections allow the forestry vehicle to sense and control multiple aspects of the disc saw felling head 100 as will be described further.

As used herein, "hydraulically connected" refers to arrangements in which two components can exchange hydraulic fluid, including connections through hydraulic lines (e.g., hydraulic hoses, hydraulic tubing), internal passages, and manifolds, or through intermediary components (e.g., filters, fittings, valves). Similarly, "electrically connected" refers to arrangements in which two components can exchange electrical power or signals, including connections through wire harnesses.

The disc saw felling head 100 includes a disc saw 104 rotatably mounted near the bottom of the frame 102. When operating, the disc saw 104 may rotate at a few hundred to a few thousand rotations per minute, as one example it may rotate at 1,000 RPM. As the forestry vehicle approaches a tree with the disc saw 104 rotating, it will command one or more arms 106 to open, such as by commanding a valve located on the disc saw felling head 100 to open and allow hydraulic fluid to flow from a hydraulic pump on the forestry vehicle into hydraulic cylinders which open the one or more arms 106. With the one or more arms 106 open, the forestry vehicle may bring the disc saw 104 into engagement with the tree, for example by driving the forestry vehicle towards the tree or by extending a linkage and moving the disc saw felling head 100 forward relative to the forestry vehicle. As the disc saw 104 cuts through the tree, the newly cut bottom of the tree (which may also be referred to as a butt end) may rest on a butt plate 108 and the one or more arms 106 may be closed to grab the tree and hold it against the frame 102. This may also be referred to as grappling the tree. The forestry vehicle may then move the tree to a desired location, tilt the disc saw felling head 100 in order to place the tree on the ground, and then open the one or more arms 106 to release the tree.

In FIG. 1, certain structures and shields are not depicted so as to make visible a hydraulic motor 110 positioned above the disc saw 104. The hydraulic motor 110 is rotationally coupled to the disc saw 104 so as to drive or power the disc saw 104. The hydraulic motor 110 may be controlled, and supplied with pressurized hydraulic fluid, by the forestry vehicle. When the forestry vehicle is in operation at a worksite, the hydraulic motor 110 provides power to the disc saw 104 to bring its rotational speed to, or maintain its rotational speed at, a desired saw speed. When the disc saw 104 falls below this desired saw speed, such as when a tree is harvested, the forestry vehicle may command the hydraulic motor 110 to provide increased power to the disc saw 104 until the disc saw 104 returns to the desired saw speed.

FIG. 2 illustrates a lower portion of the disc saw felling head 100 with portions of certain components cut away to better depict the rotational coupling of the hydraulic motor 110 to the disc saw 104. The hydraulic motor 110 is rotationally coupled, and transmits rotational power, to the disc saw 104 via a mandrel 112. As one example of how the hydraulic motor 110 may be rotationally coupled to the disc saw 104, the upper end of the mandrel 112 may comprise an internally splined receptacle which receives an externally splined shaft of the hydraulic motor 110 while the lower end of the mandrel 112 may comprise a surface which is fastened via bolts to a mating top surface of the disc saw 104.

The hydraulic motor 110 is powered by a hydraulic supply hose 114 and a hydraulic return hose 116, through which pressurized hydraulic fluid flows into a corresponding high pressure port and a low pressure port. In the embodiment shown in FIGS. 1-3, the pressurized hydraulic fluid is controlled by a hydraulic valve, which in turn receives pressurized hydraulic fluid from a hydraulic pump driven by an engine on the forestry vehicle and returns hydraulic fluid to a reservoir provided on the forestry vehicle. When the hydraulic motor 110 is exposed to pressurized hydraulic fluid from the hydraulic supply hose 114, the hydraulic fluid causes the hydraulic motor 110 to rotate and hydraulic fluid exits through the hydraulic return hose 116. Due to manufacturing tolerances of hydraulic motors, some of the hydraulic fluid bypasses the pistons and internal valves of the hydraulic motor 110 and is collected in a case drain cavity of the hydraulic motor 110. This case drain cavity, which may also be referred to as a case cavity, includes a series of internal cavities and passages which interconnect to allow such hydraulic flows or leakage to reach a case drain, which allows the hydraulic fluid to be drained from the hydraulic motor 110 through a motor drain hose 118. This case drain flow is normal during the operation of the hydraulic motor 110, and the rate of flow may vary based on its condition, the temperature of the hydraulic fluid, the pressures in its work passages, and the back pressure at the case drain, to name but a few factors. Depending on the design of the hydraulic motor 110, the hydraulic system may need to be configured to keep the backpressure at the case drain below a maximum pressure above the atmospheric pressure. As one example, a hydraulic system may be designed to keep the case drain backpressure below a maximum pressure of 5 bar, with a target of less than 1 bar, and with an average flow rate of 3 to 5 liters of hydraulic fluid per minute out of the case drain.

The mandrel 112 is mounted into the frame 102 utilizing two bearings, an upper bearing 120 and a lower bearing 122. The upper bearing 120 surrounds and receives an upper portion of the mandrel 112, and the lower bearing 122 surrounds and receives a lower portion of the mandrel 112. In FIG. 2, portions of both the upper bearing 120 and the lower bearing 122 are hidden from view to better show the bearings. The upper bearing 120 and the lower bearing 122 provide support to the mandrel 112, allowing forces from the disc saw 104 to be transferred to the structure 102 via the mandrel 112 and these bearings instead of through the hydraulic motor 110 while allowing the mandrel 112 to rotate relative to the frame 102. The upper bearing 120 and the lower bearing 122 may be any of a number of different types of bearing, but in the embodiment shown in FIGS. 1-3 they are illustrated as tapered roller bearings suitable to handling the thrust and radial loads transferred from the disc saw 104 to the mandrel 112.

The mandrel 112, upper bearing 120, and the lower bearing 122 are positioned at least partially within a mandrel cavity 124. Lubricant may be injected into, or flow through, the mandrel cavity 124 in order to lubricate, cool, and flush components within the cavity. Lubrication, cooling, and flushing may improve the performance and extend the life of the upper bearing 120 and lower bearing 122. While the injection or flow of lubricant through the mandrel cavity 124 may be desirable for the performance and life of certain of the components at least partially contained therein, for cost, performance, weight, or packaging reasons, the sealing or materials surrounding the mandrel cavity 124 may not be configured to withstand significant pressures. As one example, the mandrel cavity 124 may be configured to withstand a maximum pressure of 10 bar, with a target of less than 1 bar.

In the embodiment shown in FIGS. 1-3, lubricant is provided to the mandrel cavity 124, and therefore to the upper bearing 120 and the lower bearing 122, through a drain intake hose 126. The drain intake hose 126 receives hydraulic fluid from the case drain of the hydraulic motor 110 via the motor drain hose 118, and is fluidly connected to a bottom portion of the mandrel cavity 124. In certain embodiments, the motor drain hose 118 may be the same as the drain intake hose 126, and may consist of one hydraulic hose routed from the case drain of the hydraulic motor 110 directly to the mandrel cavity 124. In other embodiments, such as the embodiment shown in FIGS. 1-3, these are two separate hoses which are hydraulically connected to each other. After the mandrel cavity 124 fills with hydraulic fluid, the hydraulic fluid can exit through a hydraulic return line 128 which hydraulically connects the mandrel cavity 124 to a hydraulic reservoir on the forestry vehicle.

With this hose configuration, case drain flow from the hydraulic motor 110 is collected within its case, is drained from the case by the motor drain hose 118, then flows to the drain intake hose 126, then fills and flows through the mandrel cavity 124, is drained by the hydraulic return line 128, and returns to the hydraulic reservoir on the forestry vehicle. In some embodiments, the hydraulic fluid may pass through a hydraulic filter before being returned to the hydraulic reservoir. This configuration provides a low pressure and low flow source of hydraulic fluid to the mandrel cavity 124, including the mandrel 112, upper bearing 120, and lower bearing 122, enabling those components to be lubricated, cooled, and flushed with hydraulic fluid without the added cost, weight, or complexity of an additional component such as a dedicated hydraulic valve or pump.

As an alternative to the embodiment shown in FIGS. 1-3, the source of the hydraulic fluid provided to the drain intake hose 126 may be a different hydraulic component. As one example, a portion of the return flow from a hydraulic control valve may be diverted to the drain intake hose 126 to provide hydraulic fluid to the mandrel cavity 124. In such an embodiment, the hydraulic control valve (e.g., a valve controlling the one or more arms 106) may connect the low-pressure side of a hydraulic cylinder to the hydraulic reservoir on the forestry vehicle, resulting in a flow of hydraulic fluid through a return line at a pressure slightly above the hydraulic reservoir. Connecting the drain intake hose 126 to this return line may provide low-pressure hydraulic fluid to the mandrel cavity 124.

FIG. 3 provides another view of some of the components between the hydraulic motor 110 and the disc saw 104. The splined shaft of the hydraulic motor 110, upper bearing 120, mandrel 112, lower bearing 122, and disc saw 104 rotate about an axis 132. As used herein, "upper" and "above" refer to direction 134 along the axis 132 which is the direction away from the disc saw 104, and "lower" and "below" refer to direction 136 along the axis 132 which is the direction toward the disc saw 104. While the terms "upper," "above," "lower," and "below" are used herein consistent with the direction of gravity when the disc saw felling head 100 is in the upright position, as shown in FIG. 1, note that these terms may not be consistent with the direction of gravity for certain orientations into which the forestry vehicle may place the disc saw felling head 100.

Hydraulic fluid drains from the case cavity 117 of the hydraulic motor 110 at a case drain port 138, flows through the motor drain hose 118, flows through the drain intake hose 126, and enters the mandrel cavity 124 through a mandrel inlet port 140. This hydraulic fluid may then fill the mandrel cavity 124 with hydraulic fluid until it reaches a mandrel drain port 142 then flows through the hydraulic return line 128 back to the hydraulic reservoir on the forestry vehicle. Therefore, the mandrel cavity 124 is hydraulically connected to the case cavity 117 of the hydraulic motor 110 downstream of the case cavity, and is hydraulically connected to the hydraulic reservoir upstream of the hydraulic reservoir. The case cavity 117 of the hydraulic motor 110 is upstream of the components which receive hydraulic fluid from it, including the motor drain hose 118, drain intake hose 126, mandrel cavity 124, and hydraulic return line 128. The mandrel cavity 124 is downstream of those components it receives hydraulic fluid from, including the drain intake hose 126, motor drain hose 118, and the case cavity 117 of the hydraulic motor 110, while it is upstream of those components which receive hydraulic fluid from it, including the hydraulic return line 128 and the hydraulic reservoir of the forestry vehicle. Intermediate components in this flow of hydraulic fluid are hydraulically connecting the upstream and downstream components, such that the mandrel inlet port 140 is hydraulically connecting the case cavity 117 of the hydraulic motor 110 and the mandrel cavity 124, while the mandrel drain port 142 is hydraulically connecting the mandrel cavity 124 and the hydraulic return line 128.

In the embodiment shown in FIGS. 1-3, the mandrel inlet port 140 is located below the upper bearing 120 and below at least a portion of the lower bearing 122, and the mandrel drain port 142 is located above both the upper bearing 120 and the lower bearing 122. In alternate embodiments, the relative positions of the upper bearing 120, lower bearing 122, mandrel inlet port 140, and mandrel drain port 142 may be different. As one example, the mandrel inlet port 140 may be located above at least a portion of one or both of the upper bearing 120 and the lower bearing 122, while the mandrel drain port 142 may be located below at least a portion of one or both of the upper bearing 120 and the lower bearing 122. As another example, both the mandrel inlet port 140 and the mandrel drain port 142 may be located above at least a portion of one or both of the upper bearing 120 and the lower bearing 122.

As an alternative to the motor drain hose 118, drain intake hose 126, and placement of the case drain port 138, the hydraulic motor 110 may be provided with a case drain port which is located within a mounting flange 144 on which the hydraulic motor 110 is mounted. This placement of the case drain port would allow the case drain from the hydraulic motor 110 to directly drain into the mandrel cavity 124, eliminating the need for the motor drain hose 118 and drain intake hose 126.

Without in any way limiting the scope, interpretation, or application of the claims appearing below, a technical effect of one or more of the example embodiments disclosed herein is the provision of a lubrication, cooling, and flushing system for a mandrel and bearings for a disc saw without an additional hydraulic pump or hydraulic valve. Another technical effect of one or more of the example embodiments disclosed herein is the provision of a lubrication, cooling, and flushing system for a mandrel and bearings for a disc saw requiring less manual effort or maintenance, such as a greasing routine.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An attachment for a work vehicle comprising:
   a hydraulic motor comprising a case cavity and a case drain port, the case drain port configured to drain hydraulic fluid from the case cavity to outside the hydraulic motor;
   a bearing;
   a mandrel received by the bearing;
   a disc saw rotationally coupled to the hydraulic motor via the mandrel; and
   a mandrel cavity surrounding the mandrel and including a mandrel inlet port and a mandrel drain port, at least a portion of the bearing disposed within the mandrel cavity, the mandrel cavity hydraulically connected to the case cavity downstream of the case cavity and configured so that hydraulic fluid from the case cavity flows through the case drain port, through the mandrel inlet port, through the mandrel cavity, through the mandrel drain port, to a hydraulic return line.

2. The attachment of claim 1, further comprising:
   a mounting flange on which the hydraulic motor is mounted; and
   the case drain port, the case drain port hydraulically connecting the case cavity and the mandrel cavity, the case drain port located within a perimeter of the mounting flange.

3. The attachment of claim 1, further comprising a hydraulic line hydraulically connecting the case cavity and the mandrel cavity.

4. The attachment of claim 1, wherein the mandrel cavity is hydraulically connected to a hydraulic return line, the hydraulic return line configured to return hydraulic fluid from the case cavity to a hydraulic reservoir via the mandrel cavity.

5. The attachment of claim 4, further comprising the mandrel drain port hydraulically connecting the mandrel cavity to the hydraulic return line, wherein at least a portion of the mandrel drain port is located above at least a portion of the bearing when the attachment is upright.

6. The attachment of claim 4, further comprising:
   an axis about which the mandrel rotates; and
   the mandrel drain port hydraulically connecting the mandrel cavity to the hydraulic return line;
   wherein the bearing is located above the disc saw along the axis and at least a portion of the mandrel drain port is located above at least a portion of the bearing along the axis.

7. The attachment of claim 4, further comprising:
   the mandrel inlet port hydraulically connecting the case cavity and the mandrel cavity;
   the mandrel drain port hydraulically connecting the mandrel cavity and the hydraulic return line; and
   an axis about which the mandrel rotates;
   wherein the bearing is located above the disc saw along the axis, at least a portion of the mandrel inlet port is located above at least a portion of the bearing along the axis, and at least a portion of the mandrel drain port is located below at least a portion of the bearing along the axis.

8. The attachment of claim 4, further comprising:
the case drain port included in the hydraulic motor and the mandrel inlet port cooperating to hydraulically connect the case cavity and the mandrel cavity; and
the mandrel drain port hydraulically connecting the mandrel cavity and the hydraulic return line;
wherein the case drain port, mandrel inlet port, mandrel drain port, and hydraulic return line are configured to allow hydraulic fluid to flow from the case cavity to the hydraulic reservoir via the mandrel cavity.

9. The attachment of claim 1, further comprising:
the case drain port included in the hydraulic motor and hydraulically connected to the case cavity;
a hydraulic line hydraulically connecting the case drain port and the mandrel inlet port;
the mandrel inlet port hydraulically connecting the hydraulic line and the mandrel cavity;
the mandrel drain port hydraulically connecting the mandrel cavity to a hydraulic return line; and
the hydraulic return line hydraulically connecting the mandrel drain port to a hydraulic reservoir.

10. The attachment of claim 9, further comprising an axis about which the mandrel rotates, wherein the bearing is located above the disc saw along the axis, at least a portion of the mandrel inlet port is located below at least a portion of the bearing along the axis, and at least a portion of the mandrel drain port is located above at least a portion of the bearing along the axis.

11. The attachment of claim 10, wherein the lowest portion of the mandrel drain port is located above the highest portion of the bearing along the axis.

12. The attachment of claim 1, wherein the bearing is a lower bearing, the attachment further comprising:
an axis about which the mandrel rotates, the lower bearing located above the disc saw along the axis; and
an upper bearing, the mandrel received by the upper bearing, the upper bearing located a distance above the lower bearing along the axis.

13. The attachment of claim 12, wherein the attachment is configured so hydraulic fluid flows from the case cavity to the mandrel cavity to a hydraulic reservoir.

14. The attachment of claim 13, wherein the attachment is configured so hydraulic fluid enters the mandrel cavity below at least a portion of the lower bearing along the axis and exits the mandrel cavity above at least a portion of the upper bearing along the axis.

15. The attachment of claim 13, wherein the attachment is configured so hydraulic fluid enters the mandrel cavity above at least a portion of the upper bearing along the axis and exits the mandrel cavity below at least a portion of the lower bearing along the axis.

16. The attachment of claim 12, further comprising:
the case drain port included in the hydraulic motor and hydraulically connected to the case cavity;
a hydraulic line hydraulically connecting the case drain port and the mandrel inlet port;
the mandrel inlet port hydraulically connecting the hydraulic line and the mandrel cavity;
the mandrel drain port hydraulically connecting the mandrel cavity to a hydraulic return line; and
the hydraulic return line hydraulically connecting the mandrel drain port to a hydraulic reservoir.

17. The attachment of claim 16, wherein the mandrel cavity is fluid-tight except for the mandrel inlet port and the mandrel drain port.

18. A disc saw felling head comprising:
a hydraulic motor including a high pressure port, a low pressure port, a case cavity, a case drain port, and an output shaft, the hydraulic motor configured to be powered by the flow of hydraulic fluid into the high pressure port and out of the low pressure port, the case drain port configured to drain hydraulic fluid from the case cavity to outside the hydraulic motor;
a mandrel rotationally coupled to the output shaft;
an axis about which the mandrel rotates;
a mandrel cavity including a mandrel inlet port and a mandrel drain port, the mandrel cavity surrounding the mandrel;
an upper bearing, at least a portion of the upper bearing disposed within the mandrel cavity, the mandrel received by the upper bearing;
a lower bearing, at least a portion of the lower bearing disposed within the mandrel cavity, the mandrel received by the lower bearing;
a disc saw rotationally coupled to the hydraulic motor via the mandrel, the disc saw configured to be powered by the hydraulic motor; and
a hydraulic return line;
wherein:
the lower bearing is positioned between the upper bearing and the disc saw along the axis; and
the disc saw felling head is configured so hydraulic fluid from the case cavity flows through the case drain port, through the mandrel inlet port, through the mandrel cavity, through the mandrel drain port, to the hydraulic return line.

19. The disc saw felling head of claim 18, further comprising a hydraulic line, wherein:
the disc saw felling head is configured so hydraulic fluid from the case cavity flows through the case drain port, through the hydraulic line, through the mandrel inlet port, through the mandrel cavity, through the mandrel drain port, through the hydraulic return line, to a hydraulic reservoir;
at least a portion of the mandrel inlet port is positioned between at least a portion of the lower bearing and the disc saw along the axis; and
at least a portion of the mandrel drain port is positioned between at least a portion of the upper bearing and the output shaft along the axis.

20. The disc saw felling head of claim 18, wherein:
at least a portion of the mandrel inlet port is positioned between at least a portion of the upper bearing and the output shaft along the axis; and
at least a portion of the mandrel drain port is positioned between at least a portion of the lower bearing and the disc saw along the axis.

* * * * *